Aug. 12, 1924.  
G. G. RHINEVAULT  
JOURNAL BEARING  
Filed Feb. 21, 1924

1,505,075

Inventor  
Glenn G. Rhinevault  
By Geo. B. Willcox  
Attorney

Patented Aug. 12, 1924.

1,505,075

UNITED STATES PATENT OFFICE.

GLENN G. RHINEVAULT, OF SAGINAW, MICHIGAN, ASSIGNOR OF ONE-HALF TO WM. B. MERSHON & CO., OF SAGINAW, MICHIGAN, A CORPORATION OF MICHIGAN.

JOURNAL BEARING.

Application filed February 21, 1924. Serial No. 694,253.

*To all whom it may concern:*

Be it known that I, GLENN G. RHINEVAULT, a citizen of the United States, residing at Saginaw, in the county of Saginaw and State of Michigan, have invented certain new and useful Improvements in Journal Bearings; and I do hereby declare the following to be a full, clear, and exact description of the invention, such as will enable others skilled in the art to which it appertains to make and use the same.

This invention relates to journal bearings and pertains more particularly to an oil or grease-retaining device by which the lubricant is prevented from escaping from the end of the bearing and being thrown off by centrifugal force.

In some types of bearings, as for example the journal bearings of band-saw wheels, it is important that escape of grease or oil be prevented not only from the standpoint of cleanliness but also because lubricant spattered on the band-saw becomes a source of danger on account of slippage.

My improved oil-retaining device operates on the principle of retaining the lubricant in the journal bearing by means of fluid pressure in the opposite direction, such fluid pressure being created by the centrifugal force of the lubricant which normally tends to escape. This centrifugal force which opposes leakage from the bearing is produced by the impelling action of a disk revolving on the journal. The disk construction which comprises a feature of my improvement is preferably formed on one face with radially disposed grooves in which the exuding lubricant is accumulated in small masses, until the centrifugal force of the accumulated mass becomes strong enough to overcome the adhesion between the material and the face of the revolving disk. Thereupon the small mass is thrown outward, opposite the leakage flow, thereby blocking all further escape of lubricant from the journal.

With the foregoing and certain other objects in view which will appear later in the specifications, my invention comprises the devices described and claimed and the equivalents thereof.

In the drawings, Fig. 1 is a section of the journal box of a band-saw wheel, with my improvement applied thereto, the bearing in this instance being a roller bearing.

Figure 1:
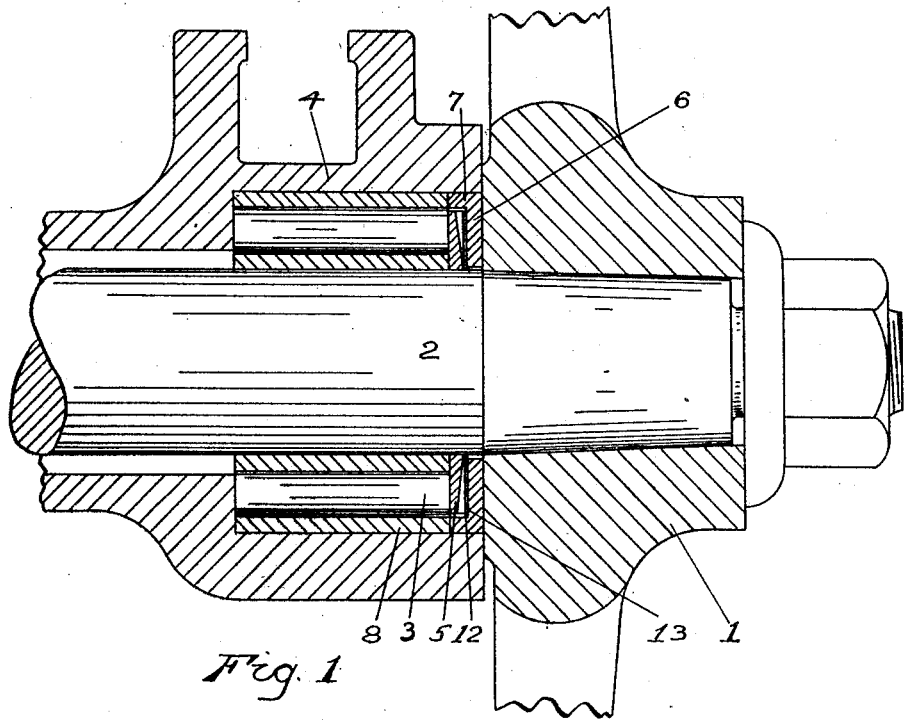

As is clearly shown in the drawings, 1 represents the hub of the fly-wheel and 2 is the journal revolving in a roller bearing 3 or its equivalent, and 4 is the housing or journal box.

My improvement by which escape of lubricant from the bearing is prevented includes an annular disk 5 fixed to the journal 2. This disk revolves with one face which I term its working face, adjacent the face of an apertured closure, such as a fixed ring 6 which may be secured in the chambered journal box or housing 4. The ring 6 preferably has a flange 7 on its outer rim, the flange registering with the outer face 8 of the roller bearing to hold it in place in the housing as in Fig. 1.

Figure 2:
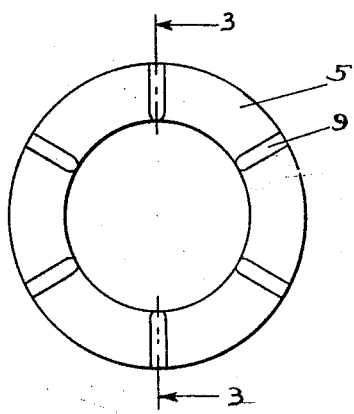
Fig. 2 is a plan view of the centrifugal disk.
Figure 3:
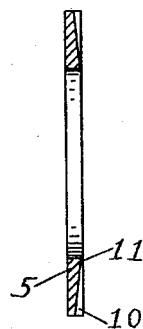
Fig. 3 is a cross section on line 3—3 of Fig. 2.

The working face of disk 5 is formed with grooves 9 from the inner diameter to the outer diameter and preferably radial, as shown in Fig. 2. The grooves are preferably deeper at the outer edge 10 of disk 5 than at its inner edge 11, as shown in Fig. 3.

Because disk 5 revolves with jouranl 2, ring 6 being stationary, any lubricant which exudes through the clearance space 12 can only escape therefrom by moving inward toward journal 2 between the opposing faces of the revolving disk 5 and fixed ring 6.

I prefer to leave a small clearance 13 between these two faces, for the purpose now to be explained.

Lubricant that has exuded through the clearance space 12 and into space 13 between the face of fixed ring 6 and the grooved face of revolving disk 5 ordinarily would find its way out between the journal 2 and the bore of ring 6, but the radially disposed grooves 9 in the face of the revolving disk 5 fill with exuding lubricant that accumulates in sufficient mass so that the centrifugal force of the mass overcomes the adhesion or surface friction tending to hold it in the clearance space 13. The mass thus driven outward causes sufficient back pressure against the lubricant in the journal to prevent further exuding through clearance space 12.

In practice this counter action has been found so effective that no trace of lubricant escapes from the bearing while the journal 2 is running. As applied to the journals of band-saw wheels, which operate continuously for long periods of time, this result is especially advantageous.

I have demonstrated by experiment that when the bearing is filled with a lubricant, such as cup grease, and there is no lubricant in the clearance space 13 or in the grooves 9 the action of the grooved disk on the air when the disk is in motion is similar to the action of a rotary fan. It draws air into the housing through the clearance space between the bore of ring 6 and the journal, thereby proving the existence of a small but sufficient tendency to create back pressure of air against the lubricant in the bearing. Furthermore when small masses of lubricant have accumulated in the grooves 9 and are directed outward by centrifugal force as herein explained, the back pressure is sufficient to prevent any leakage of lubricant.

Having thus described my invention, what I claim and desire to secure by Letters Patent is:

1. In combination, a journal, a chambered journal box having an apertured closure through which the journal projects, an annular disk fixed to the journal within said box, a face of said disk provided with outwardly extending grooves, said grooved face revolvable in proximity to the inner face of said closure.

2. In combination, a journal, a chambered journal box having an apertured closure through which the journal projects, an annular disk fixed to the journal within said box, a face of said disk provided with outwardly extending grooves deeper at the outer periphery than at the inner periphery of said disk, said grooved face revolvable in proximity to the inner face of said closure.

3. In combination, a journal, a chambered journal box having a removable apertured closure through which the journal projects, an annular disk fixed to the journal within said box, a face of said disk provided with depressions, said face revolvable in proximity to the inner face of said closure, there being a clearance space for lubricant between the outer rim of said disk and the wall of said chambered journal box.

In testimony whereof, I affix my signature.

GLENN G. RHINEVAULT.